United States Patent [19]

Luckenbach

[11] 4,074,691

[45] Feb. 21, 1978

[54] OPEN SHROUD TRICKLE VALVE

[75] Inventor: Edward C. Luckenbach, Mountainside, N.J.

[73] Assignee: Exxon Research & Engineering Co., Linden, N.J.

[21] Appl. No.: 701,598

[22] Filed: July 1, 1976

[51] Int. Cl.² ............................................. F16K 15/00
[52] U.S. Cl. .................................. 137/382; 137/527.6
[58] Field of Search .............. 251/299; 137/382, 527.6

[56] References Cited

U.S. PATENT DOCUMENTS

| 608,450 | 8/1898 | Godfrey | 137/527.6 X |
|---|---|---|---|
| 2,838,062 | 6/1958 | Held et al. | 137/527.6 X |
| 2,838,063 | 6/1958 | Weits et al. | 137/527.6 X |
| 2,838,065 | 6/1958 | Held et al. | 137/527.6 X |

*Primary Examiner*—Arnold Rosenthal

*Attorney, Agent, or Firm*—F. Donald Paris

[57] ABSTRACT

An open shrouded trickle valve for use in processes such as those adapted for fluid cat crackers and particularly for use in a cyclone dipleg to eliminate the shroud normally employed. The valve is connected at the exit of the dipleg to provide a seal so that the collected solids can be returned directly to the bed and comprises a flapper plate which is disposed to prevent backflow of gas up the exit opening when solids flow is interrupted or when a bubble of gas passing through the bed is directed up the dipleg thereby preventing direct loss of solids out of the cyclones. Situated a fixed distance behind the flapper plate is a flat baffle plate disposed in a vertical position and wider than the flapper plate, which serves to protect the flapper plate by preventing local disturbances such as passing bubbles from affecting its position with respect to the exit opening.

6 Claims, 3 Drawing Figures

OPEN SHROUD TRICKLE VALVE

BACKGROUND OF THE INVENTION

As a general rule in processes such as those for fluid cat crackers it has been common practice to employ fully-shrouded trickle valves on all of the primary and secondary cyclone diplegs for sealing the legs in order to insure good cyclone operation. These valves generally are located in the fluid beds such that if the valve fails, a hydraulic seal will result. That is, the solids will be directly discharged into the bed and solids can be sucked up into the dipleg from the bed to establish a level of catalyst in the dipleg which will correspond to the pressure in the dipleg. This pressure is generally lower than the pressure at the top of the bed so that the level will be higher than the bed level. To prevent action of the bubbles which occur in the fluid bed from affecting the flapper action (i.e., opening and closing motion) of the valve, it is common to employ a large pipe shroud around the valve. Valves which employ such expedients are commonly referred to as fully shrouded valves such as disclosed in U.S. Pat. No. 2,838,062. Other aspects and applications of these conventional valves may be found by referring to U.S. Pat. Nos. 2,838,065; 2,901,331; and 2,838,063, the latter of which is considered most relevant to the present invention. Alternatively, oftentimes splash baffles are used on the cyclone diplegs because of the relatively large cost of the alloy trickle valves. It is desirable, however, to use these valves in order to maximize the density of the catalyst in the cyclone diplegs and to maintain the catalyst flow down the dipleg, i.e., preserve the collection efficiency of the cyclone, especially during times when the catalyst levels are below the level of the outlet from diplegs.

The use of full shrouds was developed at a time when the size of the bubbles which are developed in the fluid cat cracker beds was a relatively unknown factor. At the time it was suspected that large bubbles existed which would violently and undesirably move the flapper plate out of its desired position. In accordance with recent investigations in fluid solids technology, it is now believed that these bubbles, in the use of regenerators, are substantially smaller than originally anticipated, being about one inch in diameter, and in the case of reactors, are about three inches in diameter. It, therefore, has become apparent that the need for these large full shrouds heretofore employed no longer exists.

However, it is apparent that some protection of the flapper plate is necessary in order to prevent a local disturbance from torch oil, spray water, eroded grid holes, broken seals, etc., from affecting its position with respect to the outlet opening from the dipleg, which could result in displacing the flapper and/or diverting gas directly into the dipleg. Further incentives for eliminating the shroud are the relatively high cost of the valves which are usually made of a high cost alloy steel and, therefore, the shroud adds considerably to the valve cost. The shrouds also are extremely large, e.g., 26 inches in diameter for a typical 16 inch dipleg, and take up a large amount of the bed or cross-sectional area, which reduces the volume available for effective regeneration or reaction of catalyst. In addition, the relatively large weight of the shrouds places an undesirable bending moment on the diplegs.

SUMMARY OF THE INVENTION

With the foregoing in mind, the present invention is directed towards providing an improved trickle valve which will overcome the disadvantages and deficiencies of prior art valves. Accordingly, there has been provided a trickle valve which is open-shrouded and capable of use with cyclone diplegs and is of simple and low cost construction, and provides effective protection for the valve flapper plate without occupying the amount of space heretofore occupied by conventional valves. In accordance with the present invention, there is provided at the outlet end of the dipleg a trickle valve including a flapper plate mounted for movement between opened and closed positions for sealing the dipleg in the event that large quantities of gas could be diverted up the dipleg. At a distance situated rearwardly of the flapper plate, 3 inches although the distance can vary depending upon the size of the plate with regard to the size of the flapper, there is provided an essentially vertically disposed baffle plate which is wider than the flapper plate and serves the purpose of the previously employed shroud without the attendant disadvantages as discussed heretofore. The baffle plate extends vertically beyond the end or terminal portion of the flapper plate for a predetermined distance and thereupon is disposed at an angular orientation of approximately 45° with respect to the vertical. The angularly disposed bottom portion is rigidly secured with the upper vertical portion by means of transversely spaced gussets at opposite sides of the baffle plate. The orientation of the bottom portion of the baffle extends through and beyond the plane containing the outlet of the dipleg for approximately at least 2 inches beyond the downward projected position of the flapper in its most open position and preferably a minimum of 3 inches for larger valves bigger than 10 inch pipe size. The bend or angle orientation of the bottom portion begins at a point about 1 inch below the termination of the flapper plate, which is required in order to prevent stagnant solids, if any, from interfering with the movement of the plate. The plate terminates in a point at a slightly flatter slope, 20° to the horizontal, to minimize the amount of metal in the bottom portion.

In the Weits U.S. Pat. No. 2,838,063, there is no disclosure of protecting the flapper plate from horizontal forces in the fluid bed by employing a partially shrouded valve. The patent discloses that the so-called shroud or baffle is located completely beneath the trickle valve in a substantially horizontal disposition to prevent large bubbles from flowing directly upward past the flapper plate and disrupting its position. These valves are conventionally used in the dilute catalyst phase above a bed where only vertically directed forces exist. The Weits patent discloses that the support for the lower plate may prevent some horizontal forces from acting only on the extreme lower tip of the valve (i.e., flapper plate). However, contrary to the present invention, the support is not wider than the flapper plate and therefore has a minimal, if any, effect to prevent horizontal forces from working and acting on the upper portion of the flapper plate. It is apparent that this prior art horizontal baffle does not prevent horizontal forces from acting on the flapper, but merely provides rigidity to support the plate beneath the valve. In contrast, the flat protective baffle plate of the present invention prevents the horizontal forces from acting on the valve and because it is situated at a predetermined fairly close distance to the flapper plate, this avoids the need for making it large. The plate also has the added advantage that it can mount the hinge ring and flapper support and thus minimize the amount of valve fabrication. This location of the relatively small baffle plate directly behind the flapper to protect the flapper action is not disclosed in the prior art.

The foregoing and other objects and advantages of the present invention will be apparent to those skilled in the art upon reading of the following detailed description in conjunction with the accompanying drawings.

DESCRIPTION OF THE PREFERRED EMBODIMENT

Figure 1:
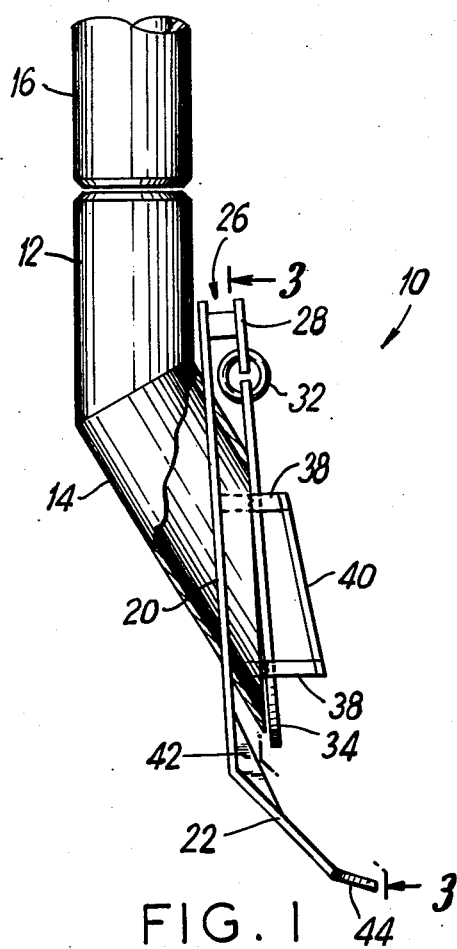
FIG. 1 is a side elevational view of a preferred embodiment of an open shroud trickle valve according to the present invention.
Figure 2:
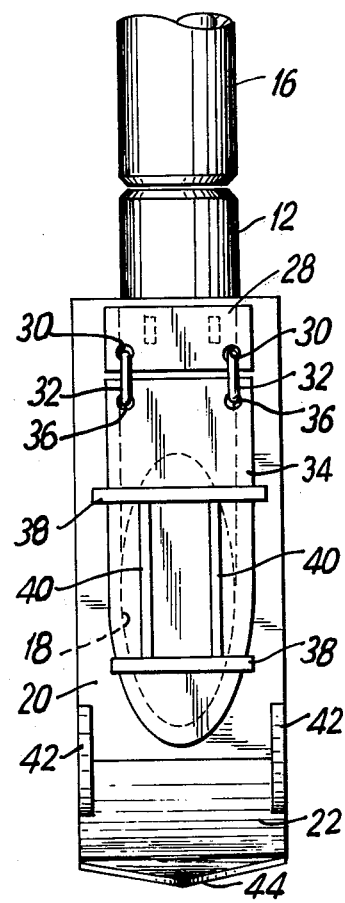
FIG. 2 is a front elevational view of the trickle valve shown in FIG. 1.
Figure 3:
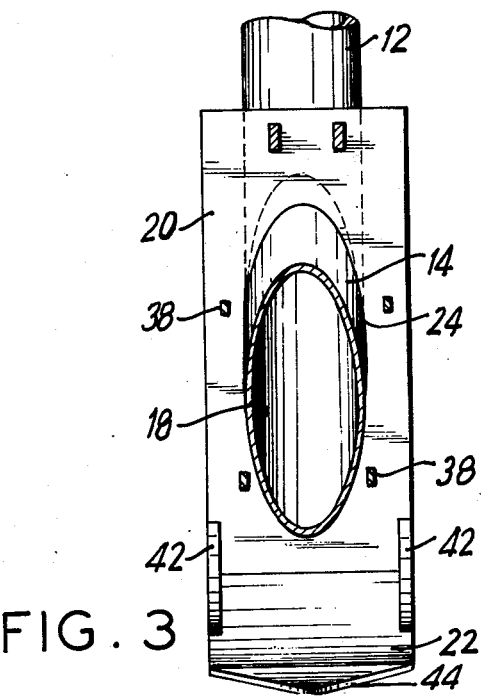
FIG. 3 is a cross sectional view taken substantially along the line 3—3 of FIG. 1.

Referring now to the drawings wherein like parts are designated throughout the several views by the same reference numeral, there is shown in FIG. 1 a trickle valve generally designated 10. The valve basically comprises a pair of interconnected angularly disposed conduit members 12 and 14, the upper one of which is lineal and connected with the lower vertical portion of the cyclone dipleg 16. The bottom conduit 14 is angularly disposed with respect to the lineal portion at a typical angle of 30° relative to the vertical. This relationship permits the free-flow of catalyst out of the valve by preventing solids buildup on the sloped portion. This slope must be steeper than the angle of repose of the catalyst. At the exit or outlet end of the angularly disposed bottom conduit 14 is an opening 18 and a valve closure means according to the present invention described in detail hereinafter. At a predetermined distance rearwardly of the opening 18 is a baffle plate which comprises a vertical portion 20 and an angularly disposed lower portion 22. The vertical portion 20 typically is unitary with the bottom 22 or alternatively they may separate members secured together by welding or the like. The vertical members contain a cutout area 24 of generally elliptical shape which is complementary to the peripheral configuration of the conduit 14 so that it fits over the conduit 14 and is set back rearwardly from the outlet. An essentially conventional T-shaped bracket 26 is welded or otherwise fixedly secured to the outer surface at the upper end of the vertical baffle plate 20. The outer or head portion of the bracket 26 comprises an essentially flat member 28 having a pair of transversely spaced openings 30 through which respective annular O-shaped hinges 32 are mounted. The openings typically are greater in diameter than that of the hinges, such that the hinges can freely move within the openings both in vertical and lateral directions and even in the presence of operating temperatures which the valve may be subject to. The hinges support for pivotal movement a flat rectangular valve flapper plate 34 which has a conventional shape and mounting arrangement. The plate at its upper end adjacent the bracket 26 has a pair of openings 36 which are transversely spaced through which the hinges 32 extend and which are designed similar to those in the bracket in order to permit easy rotational movement of the hinges with respect to the openings and also to permit limited lateral movement of the hinges within the openings. The flapper plate 34 seats against the discharge openings 18 at the end of the lower conduit portion 14. The plate is elongated and tongue-shaped and is substantially larger in area in all directions than the opening 18. Its maximum horizontal and vertical dimensions are greater than the corresponding dimensions of the valve seat such that the plate will be properly seated against the valve seat 18 in any position regardless of the movement of the plate. Thus, the valve plate can move in a generally parallel direction with respect to the seat or for that matter in almost any other direction without affecting the desired seating relationship. The plate in accordance with the preferred embodiment has a substantially elliptical configuration which essentially conforms with that of the discharge opening. It is understood that the shape may be otherwise, e.g., rectangular or truncated at the edges. The valve is provided with the typical vertically spaced valve stops, each of which comprise essentially U-shaped rod-like members 38 which are secured at their outer end by transversely spaced connecting members or rods 40. The opposite end of each of the stops is secured, for example by welding, to the baffle plate on either side of the discharge opening 18. The lower stop extends further outward from the plate 20 so that all stops will be in contact with plate 20 when the plate is swung to its most open position. This arrangement permits movement of the valve plate 34 between opened and closed positions, while restricting movement to a desired range as determined by the distance (minimum) between opening 18 and the upper stop 38.

The disposition of the discharge opening 18 with respect to a vertical plane is angular such that the valve flapper plate 34 will essentially always be biased into a closed position when it is in a neutral position because of the force of gravity.

The baffle plate 20, 22 and its location comprise a significant improvement over the prior art. The vertical portion 20 of the plate is mounted preferably at a distance of approximately 3 inches rearward of the valve seat and at an angular disposition with respect to the vertical parallel to the slope of the opening of the valve. The particular rearward location of this portion of the plate is determined by the space and clearance necessary for installation, support and movement of the hinge rings. A suitable range for the rearward disposition of the plate may comprise 2 to 4 inches. The bottom angularly disposed portion 22 of the baffle plate is rigidly connected by means of transversely spaced gussets 42 on opposite sides of the plate at the bend between portions 20, 22. The angular disposition of the bottom portion 22 is at about 45° with respect to the horizontal, although it may range from 45° to 60° depending upon the vertical height available for installation of the valve. The bottom portion terminates in a tip 44 (shown as triangular in shape) extends forwardly of the maximum opening of the flapper plate projected downward for a predetermined distance, preferably a maximum of 4 inches. This distance may vary depending upon the size of the valve; however, a preferred range would be 3 to 6 inches. Another important factor in the baffle plate arrangement is that the vertical portion 20 extends below the bottom or free end of the flapper plate 34 for about 1 inch in order to insure that any catalyst which may have deaerated and settled on the plate will be far enough from the flapper plate and actual opening of the valve so as not to impede action of the plate.

The bottom portion 22 functions as a deflector plate which serves to cause any of the upwardly moving catalyst particles to move away from the valve flapper plate 34 itself and thus avoid any possible injury to the closure member. The tip on the plate merely reduces the amount of metal in the plate. Further advantages of the bottom deflector plate are to insure that any high velocity vertically oriented jet streams that might exist will not directly impinge on the flapper and opening or bottom surface of the pipe 14 of the valve. The presently constructed and mounted baffle plate will protect the flapper plate valve from local disturbances which may affect the positioning of the plate and by extending the deflector plate a sufficient distance, e.g., 3 inches forward of the flapper plate in order to prevent undesirable movement of the plate due to the bubble action in the fluidized beds. This plate will have a minimum of interference with the gas flow up from the fluid bed because of the minimal cross-sectional area it occupies and also in reactors will reduce interference with the gas and catalyst flows in the bed, thus providing an overall better flow for cat cracking processes. The vertically disposed portion 20 of the baffle plate because of its size aids in preventing any horizontal forces from acting not only on the lower tip of the valve plate 34 but also the whole plate. The relatively close location of the baffle plate to the flapper plate avoids the need for having to provide too large a protective plate and further, the plate provides a support for the hinge rings which minimizes the amount of fabrication effort required in the valve.

The plate 20 preferably should be at least 4 inches wider than flapper plate 34, and if the distance of plate 20 behind plate 34 is 4 inches or greater, it should be 6 inches wider so as to insure proper prevention of horizontal forces from acting in the valve. Plate 20 may be wider, however, this merely adds to the weight and cost of the valve.

Numerous alterations of the structure herein disclosed will suggest themselves to those skilled in the art; however, it is to be understood that the present disclosure relates to a preferred embodiment of the invention, which is for purposes of illustration only and not to be construed as a limitation of the invention. All such modifications which do not depart from the spirit of the invention are intended to be within the scope of the appended claims.

What is claimed is:

1. In a trickle valve comprising a conduit having a discharge opening and a hingedly mounted valve closure plate disposed with respect to said discharge opening for movement between opened and closed positions, wherein the improvement comprises:

(a) a baffle plate fixedly secured to and about said conduit at a location spaced rearwardly from said discharge opening, said baffle plate comprising a vertical portion and a lower deflector portion angularly disposed with respect to said vertical portion, said vertical portion extending transversely outward of said valve closure plate, and said deflector portion extending forward of said discharge opening for a predetermined distance.

2. In the trickle valve of claim 1 including means for rigidly securing said deflector portion with said vertical portion.

3. In the trickle valve of claim 1 including a tip at the end of said lower deflector portion which extends forward of the maximum opening of said valve closure plate.

4. In the trickle valve of claim 1, said baffle plate being disposed about the entire periphery of said discharge opening.

5. In a trickle valve comprising a conduit having a discharge opening and a hingedly mounted valve closure plate disposed with respect to said discharge opening for movement between opened and closed positions, wherein the improvement comprises:

(a) a baffle plate fixedly secured about said conduit at a location spaced rearwardly a first predetermined distance from said discharge opening, said baffle plate comprising a vertical portion and a lower deflector portion angularly disposed with respect to said vertical portion, said vertical portion extending transversely beyond said valve closure plate, said deflector portion extending forward of said discharge opening for a second predetermined distance, and support means for hingedly mounting said valve closure plate to said baffle plate at the upper end of said vertical portion.

6. In a trickle valve comprising a conduit having a discharge opening and a hingedly mounted valve closure plate disposed with respect to said discharge opening for movement between opened and closed positions, wherein the improvement comprises:

(a) a baffle plate fixedly secured to and about said conduit at a location spaced rearwardly from said discharge opening, said baffle plate comprising a vertical portion and a lower deflector portion angularly disposed with respect to said vertical portion, said vertical portion of said baffle plate being greater than the corresponding dimension for said discharge opening about the entire periphery thereof, and said deflector portion extending forward of said discharge opening for a predetermined distance, whereby said baffle plate protects said valve closure plate during operation of said valve.

* * * * *